(12) United States Patent
Soleimani et al.

(10) Patent No.: US 6,385,447 B1
(45) Date of Patent: May 7, 2002

(54) SIGNALING MAINTENANCE FOR DISCONTINUOUS INFORMATION COMMUNICATIONS

(75) Inventors: Mohammad Soleimani, Rockville; Moe Rahnema, Bethesda, both of MD (US); Jean-Aicard Fabien, Scottsdale, AZ (US); David Roos, Boyds, MD (US); Anthony Noerpel, Lovettsville, VA (US); Michael Parr, Hermosa Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/115,102

(22) Filed: Jul. 13, 1998

Related U.S. Application Data (60) Provisional application No. 60/052,443, filed on Jul. 14, 1997.

(51) Int. Cl.[7] .................................................. H04Q 7/20
(52) U.S. Cl. ...................... 455/427; 455/13.4; 455/115; 455/502; 455/13.2; 704/210; 704/215
(58) Field of Search ................................. 455/422, 427, 455/428, 12.1, 509, 450, 13.4, 38.3, 574, 502, 522, 13.2, 63; 370/321, 329, 528, 311

(56) References Cited

U.S. PATENT DOCUMENTS

| | | | | |
|---|---|---|---|---|
| 5,553,192 A | * | 9/1996 | Hayata | 704/228 |
| 5,630,016 A | * | 5/1997 | Swaminathan et al. | 395/2.37 |
| 5,722,086 A | * | 2/1998 | Teitler et al. | 455/561 |
| 5,745,524 A | * | 4/1998 | Hull | 375/244 |
| 5,758,256 A | * | 5/1998 | Berry et al. | 455/72 |
| 5,794,160 A | * | 8/1998 | Ezuriko | 455/557 |
| 5,835,889 A | * | 11/1998 | Kapenen | 704/215 |
| 5,881,101 A | * | 3/1999 | Furman et al. | 375/217 |
| 5,930,248 A | * | 7/1999 | Langlet et al. | 370/347 |
| 5,940,380 A | * | 8/1999 | Poon et al. | 370/330 |
| 5,954,834 A | * | 9/1999 | Hassan et al. | 714/758 |
| 5,960,389 A | * | 9/1999 | Jarvinen et al. | 704/220 |
| 6,035,179 A | * | 3/2000 | Virtanen | 455/63 |
| 6,038,238 A | * | 3/2000 | Jokinen et al. | 375/130 |
| 6,138,020 A | * | 10/2000 | Galyas et al. | 455/436 |

* cited by examiner

Primary Examiner—Edward F. Urban
Assistant Examiner—Temica M. Davis
(74) Attorney, Agent, or Firm—John T. Whelan; Michael W. Sales (57) ABSTRACT

A system and method employing an access terminal for maintaining discontinuous communications including a gateway receiver for receiving the discontinuous information, a radio frequency (RF) communication link via geosynchronous earth orbit satellite for conveying multiple communication channels using time division multiple access (TDMA), the access terminal initiating information communication with the receiver via at least one of the multiple communication channels. The access terminal further includes a memory for storing protocol processing information and a transmitter for establishing the radio frequency communication link to the receiver of the terrestrial gateway system. The access terminal memory provides for destroying of a signal pattern or protocol assigned to the access terminal by the gateway receiver or transmission of keep-alive bursts by the transmitter during periods of inactivity to maintain information communication with the receiver.

35 Claims, 7 Drawing Sheets

| SYMBOL POSITION | 33 | 34 | 35 | 36 | 37 | 38 | 39 | 40 | 41 |
|---|---|---|---|---|---|---|---|---|---|
| | 32 | 33 | 34 | 35 | 36 | 37 | 38 | 39 | 40 |
| | 31 | 32 | 33 | 34 | 35 | 36 | 37 | 38 | 39 |
| | 30 | 30 | 31 | 32 | 33 | 34 | 35 | 36 | 37 |
| | 28 | 29 | 30 | 31 | 32 | 33 | 34 | 35 | 36 |
| | | | | LAST POINTER | | | | | |

| SYMBOL USAGE | 5 | 5 | 6 | 6 | 6 | 6 | 6 | 5 | 5 |

SIGNALING MAINTENANCE FOR DISCONTINUOUS INFORMATION COMMUNICATIONS

This application claims priority to U.S. Provisional patent application Ser. No. 60/052,443, of Roos et al.; filed Jul. 14, 1997, for COMMON AIR INTERFACE, incorporated herein by reference.

This patent document relates to a common air interface described in a series of patent documents filed concurrently herewith. Related patent documents are: U.S. patent application Ser. No. 09/115,098, filed Jul. 13, 1998, of Joshi et al.; for SYSTEM AND METHOD FOR IMPLEMENTING TERMINAL TO TERMINAL CONNECTIONS VIA A GEOSYNCHRONOUS EARTH ORBIT SATELLITE, now U.S. Pat. No. 6,278,876; U.S. patent application Ser. No. 09/115,097, filed Jul. 13, 1998, of Roos, et al.; for MOBILE SATELLITE SYSTEM HAVING AN IMPROVED SIGNALING CHANNEL, U.S. patent application Ser. No. 09/115,096; filed Jul. 13, 1998, of Noerpel, et al.; for SPOT BEAM SELECTION IN A MOBILE SATELLITE COMMUNICATION SYSTEM, now U.S. Pat. No. 6,233,451; U.S. patent application Ser. No. 09/115,101, filed Jul. 13, 1998, of Noerpel, et al.; for PAGING RECEPTION ASSURANCE IN A MULTIPLY REGISTERED WIRELESS TRANSCEIVER, now U.S. Pat. No. 6,282,178; U.S. patent application Ser. No. 09/115,095, filed Jul. 13, 1998, of Joshi, et al.; for IMMEDIATE CHANNEL ASSIGNMENT IN A WIRELESS SYSTEM, U.S. patent application Ser. No. 09/115,099, filed Jul. 13, 1998, of Joshi, et al.; for ERROR AND FLOW CONTROL IN A SATELLITE COMMUNICATIONS SYSTEM, now U.S. Pat. No. 6,289,482; U.S. patent application Ser. No. 09/115,100, filed Jul. 13, 1998, of Roos, et al.; for SYNCHRONIZATION OF A MOBILE SATELLITE SYSTEM WITH SATELLITE SWITCHING, all of which are incorporated herein by reference.

BACKGROUND OF THE INVENTION

The present invention relates to cellular and satellite communications. More particularly, the invention relates to a method and a system for providing signaling bursts for maintaining communications channel transmissions during periods of voice inactivity during ongoing voice communications between a transmitter and a receiver in a time division multiple access (TDMA) mobile satellite communication system.

A mobile satellite communication system such as the Geosynchronous Earth Orbit Mobile (GEM) network discussed herein, typically includes one or more satellites, at least one fixed ground terminal such as a gateway system (GS) and several mobile access terminals (ATs). The access terminals typically communicate with the public switched telephone network (PSTN) or other mobile terminals via an air communication interface between the satellite and the gateway. Using the mobile access terminals, the satellite system provides a variety of telephony services. Satellite telephony systems as described herein share call processing information with terrestrial systems such as the GSM cellular system to allow compatibility between the satellite, cellular, and the public switch telephone network services. The terrestrial standards such as GSM may not apply directly to the mobile satellite communication system, more particularly the satellite air interface poses physical constraints not accounted for in the GSM architecture.

A number of communication systems utilizing satellites and small mobile terminals provide voice and other information communication. In all such systems, the bandwidth and satellite power associated with the communication links may be expensive and wasteful of limited resources. In addition, the mobile access terminals such as hand-held terminals (HHTs), which are often small, hand-held devices, are constrained by power consumption and related battery life concerns.

In maintaining an active voice communications channel, however, information must be transmitted on a regular basis for synchronization between the satellite and the access terminal, e.g., for timing, frequency, and power parameters. During voice communications, periods of voice inactivity may occur approximately half of the time. Therefore, appropriate design of burst formats, combined with voice activity detection, may provide significant power reduction. A number of specific concerns are associated with the form of information communications necessary for maintaining a communications channel, including power control information transfer requirements, power level consistency in the presence of highly variable power amplifiers, background noise level and characteristic communication, support for frequency and timing parameter tracking, timeliness of information delivery, and robust communications.

Thus, there exists a need for a method and a system for performing Keep-Alive Burst (KAB) communications during periods of voice inactivity to maintain the integrity of the voice communication transmissions over a communications channel, and provide acceptable performance with a minimum amount of power being used by the satellite and access terminal systems.

SUMMARY OF THE INVENTION

In the following description, a satellite communications system is described. As will be appreciated by a skilled artist, however, the teachings of the present invention apply to many communications systems, not just satellite-based systems. Thus, references herein to satellite systems should be understood as being directed to specific embodiments, as opposed to the invention generally.

Accordingly, the present invention, in particular embodiments, addresses a key opportunity for power savings at both the satellite and the access terminals to limit transmission of significant power to those times when voice communications is active. During periods of silence, which typically occur about sixty percent of the time, much less power may be transmitted. Nonetheless, for a variety of reasons discussed herein, some power continues to be required for transmissions during periods of voice inactivity in the form of bursts that are transmitted during such periods to maintain the integrity of the communications channel. Information transmitted during voice inactivity by such keep-alive bursts (KABs) may be categorized into two types of information, namely, explicit digital information and information implicit in the waveforms transmitted. By adopting a burst format which accounts for the necessary explicit and implicit information required for transmission during keep-alive bursts, a combination of various features in terms of power modulation in burst format results in reduced power and delay, and improves performance when compared with conventional techniques.

Briefly summarized, the present invention relates a system and method employing an access terminal for maintaining discontinuous communications including a gateway receiver for receiving the discontinuous information, a radio frequency (RF) communication link via geosynchronous earth orbit satellite for conveying multiple communication channels using time division multiple access (TDMA), the access terminal initiating information communication with the receiver via at least one of the multiple communication channels. The access terminal further includes a memory for storing protocol processing information and a transmitter for establishing the radio frequency communication link to the receiver of the terrestrial gateway system. The access terminal memory provides for storing of a signal pattern or protocol assigned to the access terminal by the gateway receiver or transmission of keep-alive bursts by the transmitter during periods of inactivity to maintain information communication with the receiver.

It will be understood that both the foregoing and general description in the following detailed description are exemplary and intended to provide further explanation of the invention as claimed. The accompanying drawings provide an understanding of the invention as described in the preferred embodiments to illustrate the invention and serve to explain the principles of the invention.

DETAILED DESCRIPTION OF THE PREFERRED EMBODIMENTS

Figure 1:
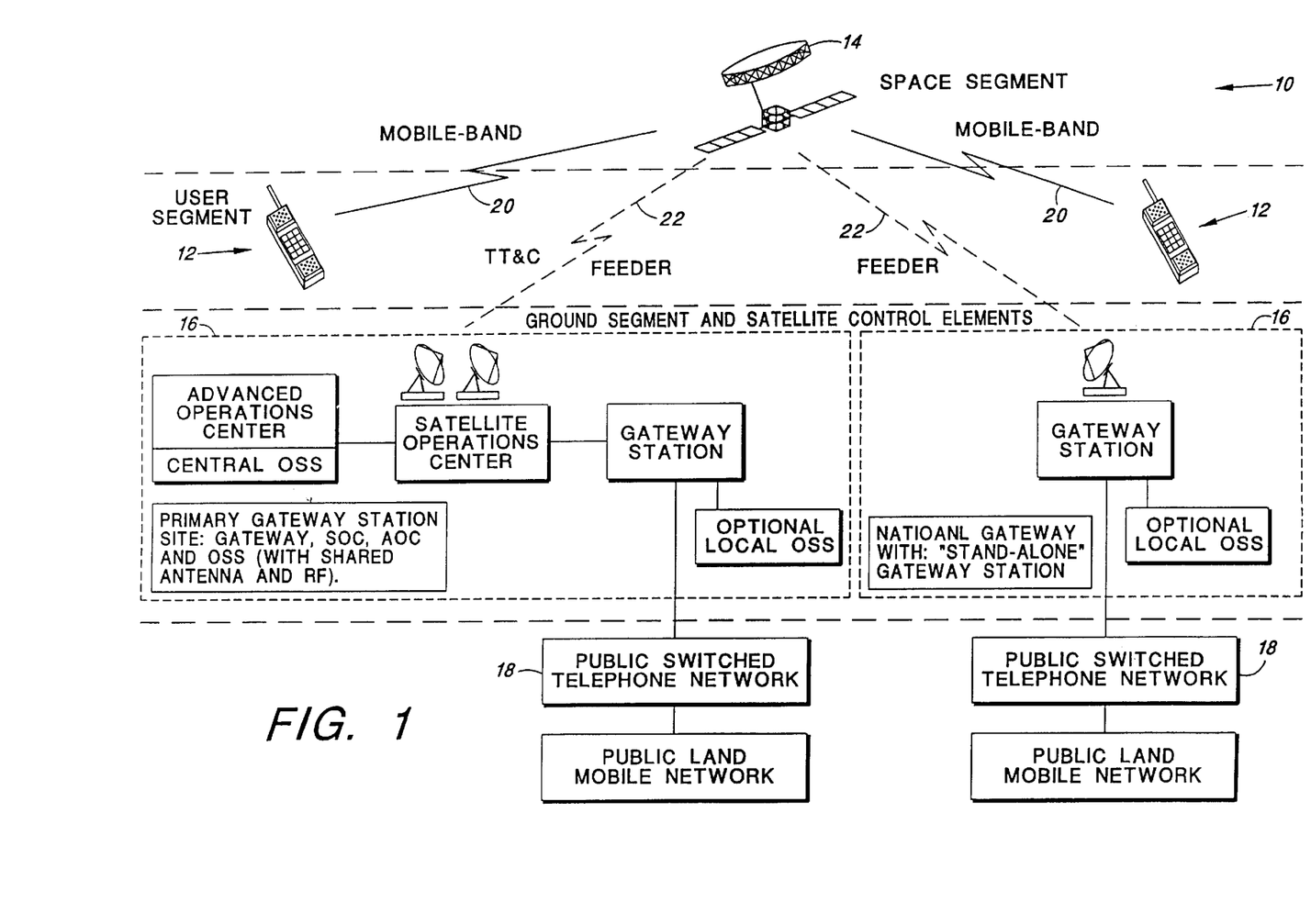
FIG. 1 is a schematic block diagram of a mobile satellite communication system in accordance with the present invention.

Referring to the drawings and particularly to FIG. 1, a preferred embodiment of a mobile satellite communication system 10 is illustrated. The mobile communication system 10, herein a Geosynchronous Earth Orbit Mobile satellite system (GEM) includes several mobile access terminals 12 and one or more satellites 14. One or more gateway stations 16 (GS) are coupled to public switch telephone networks 18 (PSTN). The access terminal 12 is typically a hand-held telephone or vehicle-mounted telephone, but, as described in the present embodiment, the access terminal 12 may provide operation both as a GEM access terminal and as an GSM cellular telephone. While being used with the satellite communication systems described herein, the access terminal 12 communicates over an L-band frequency with a particular spot beam 20 with the satellite 14. Each spot beam 20 is associated with a predetermined geographic region. The terrestrial gateway 16 communicates with the satellite 14 over a Ku-band frequency.

The satellite 14 includes transponders for translating between the L-band spot beam 20 signals used by the access terminals 12 and the Ku-band 22 signals used by the gateway 16. The gateway 16 interfaces with the terrestrial telephony carrier, such as PSTN 18, and may also interface with a conventional cellular network such as GSM. Accordingly, users may place telephone calls using the access terminal 12 to either land line or cellular telephone users. As illustrated in FIG. 1, a plurality of gateways 16 may be employed, each providing similar functions and being employed to access, for example, respective public switched telephone networks 18.

The satellite 14 provides L-band-to-L-band bent pipe single hop communications, as well as satellite switched communications to support communications between the users of the access terminals 12. At satellite 14, the L-band 20 uplink and downlink are transmitted via multiple L-band spot beams 20. Subscribers to the system 10 have unique telephone numbers allowing them to receive telephone calls when they are registered to receive pages from either the GEM or the GSM cellular network. Registration is automatic when the access terminal 12 is turned on, such that a registration procedure locates the access terminal 12 within a particular spot beam coverage area. In addition to originating calls, the access terminals 12 can receive calls from any terrestrial facility by connecting the call through the gateway station 16, at which the gateway 16 determines the location of the access terminal 12 and sends a paging message to the access terminal 12 to announce the incoming call.

The system 10 uses a low rate encoded or ciphered voice transmission. In the described embodiments, the access terminals 12 are provided with dual mode operation allowing for voice communications either via satellite or via the local cellular system, e.g., GEM and GSM as discussed herein.

The gateway 16 provides for user mobility as users travel with the access terminal 12 from spot beam to spot beam. Additionally, the communication channels carried via the satellite 14 provides space segment resources used for control functions, i.e., one or more channels in each L-band spot beam 20 are control channels, e.g., the gateway 16 may place a forward control signal in each L-band spot beam 20 to allow synchronization of the access terminals 12 and to carry network control information from the gateway 16 to the access terminals 12. The forward control channels allow the access terminals 12 to acquire a satellite carrier and identify the L-band spot beam 20 and gateway station 16 which originates the signal. The gateway 16 uses the forward control channel to page access terminals 12 using unique addresses to announce mobile terminated calls. Each L-band spot beam 20 preferably contains a return direction signaling channel that access terminals 12 use to initiate and register calls with the gateway 16. During a call, in-band low data rate control channels are preferably available between the access terminals 12 and the gateway 16 for call supervision, power control, and to initiate call termination. For example, during burst communication between the access terminal 12 and the satellite 14, a threshold signal may be established relating to the strength of the transmitted burst for setting a power control bit based on a comparison of received signal strength with threshold values. In addition to such information being transmitted during active voice communications, certain information must also be transmitted during voice inactivity by keep-alive bursts (KABs) which can be categorized as one of two types, namely, explicit digital information, and implicit information in the waveforms transmitted.

Explicit digital information provided by the keep-alive bursts include a description of the background sounds present at the transmitter's microphone, and commands and status messages associated with power control. Information implicit in the waveforms transmitted include the power level of the signal, the signal quality as perceived by the receiver, and information used in tracking both carrier frequency offset and symbol timing error for synchronization between the transmitter and receiver.

The system 10 contains considerable operational flexibility both from the standpoint of network features and mobile terminal capabilities. The gateway 16 is a conventional gateway as understood in the art, which includes a mobile switching center (MSC), base station controllers (BSCs), base transceiver stations (BTS), and radio frequency units. As is understood by those skilled in the art, the MSC allows communications with the public switch telephone network or other mobile switching centers. The MSC is connected preferably with an A-interface such as a standard E1 or E3 line with the BSC. The BSC is then connected through a communications channel such as a T1 line to one or more BTSs which may communicate via radio frequency (RF) communications to the access terminal 12. Telephony communications may be originated with the access terminal 12 by transmitting initialization data to the satellite 14 of the space segment over a control channel which then communicates down to the gateway 16. The control channel is transmitted over a time slot within a frequency assigned to the spot beam 20 having a coverage area surrounding the access terminal 12. At the gateway 16, the call is transmitted via a radio frequency channel to the BTS assigned to the spot beam 20 servicing the access terminal 12. From the BTS the call is routed to the BSC and then to the MSC, from which the call is routed to either the PSTN or another MSC. Thereafter, a communications channel is established through the entire gateway 16 and a subscriber using the access terminal 12 may communicate over the established communications channel. Calls may also originate from either the PSTN or a GSM cellular network by entering the gateway 16 at the MSC which routes information to the BSC for paging the access terminal 12 via the appropriate BTS. After the access terminal 12 responds to the page from the BTS, a communications channel is then established.

Figure 2:
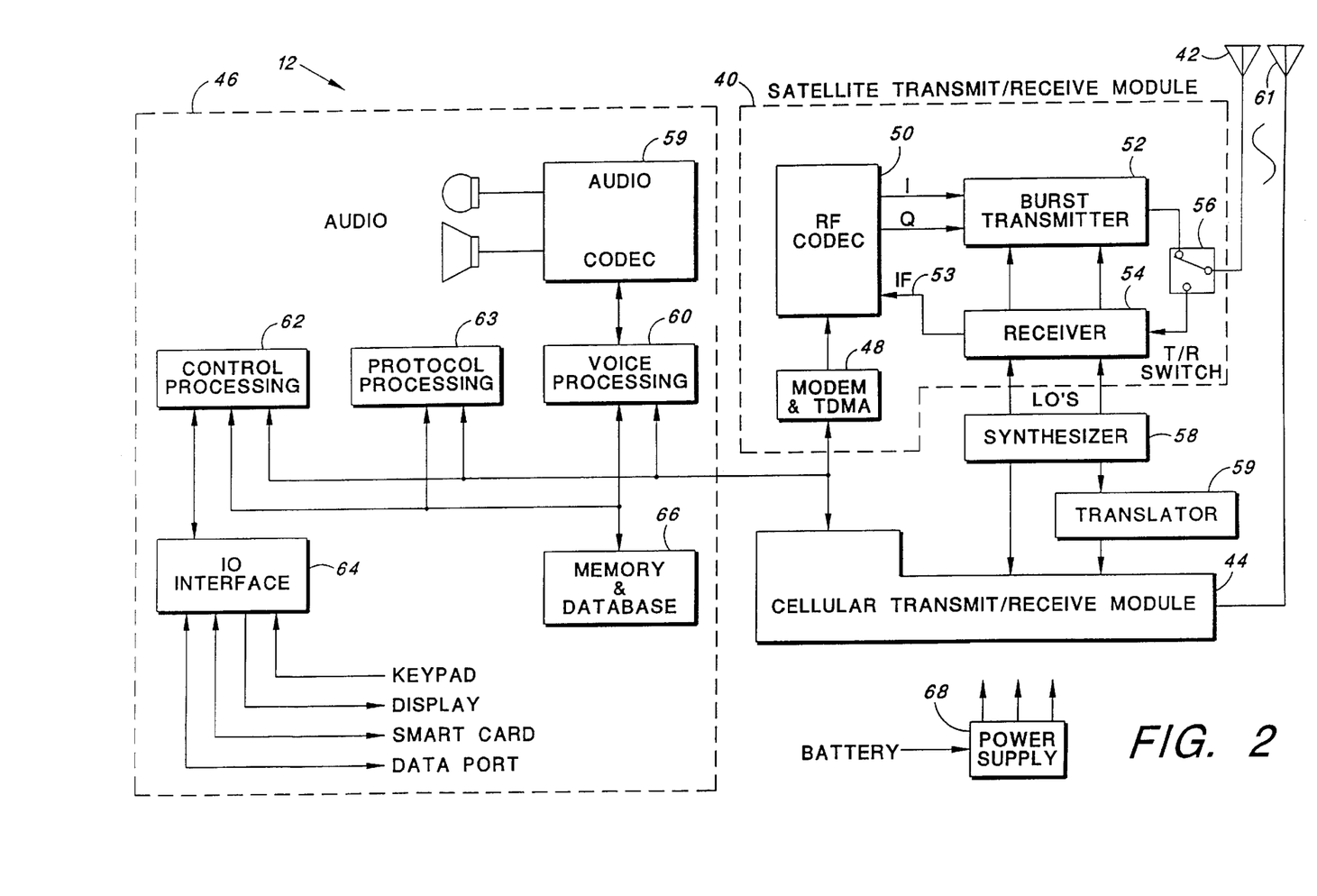
FIG. 2 is a block diagram of a preferred embodiment of a mobile access terminal for use in the mobile satellite communication system of FIG. 1.

The access terminal 12 as shown in FIG. 2 includes a satellite module 40, a satellite antenna 42, a cellular module 44, and a user interface module 46. The satellite module 40 is coupled to the user interface module 46, the cellular module 44, and the satellite antenna 42. Preferably, the satellite antenna 42 is a physically small antenna, such as a helix type antenna. The satellite module 40 includes a modem and TDMA unit 48, an RF coder and decoder (codec) 50, a burst transmitter 52, a receiver 54, and a transmit or receive (T/R) switch 56. In the preferred embodiment, the modem 48 is connected to the RF codec 50, and the RF codec 50 is connected to the burst transmitter 52 and to the receiver 54. The T/R switch 56 is connected to the burst transmitter 52, the receiver 54, and the satellite antenna 42.

Within the satellite module 40, the modem 48 converts speech or data samples to and from channel symbols using quadrature phase shift key modulation (QPSK). QPSK is preferably performed digitally by an application-specific integrated circuit or alternatively on a commercial available digital signal processor. The RF codec 50 converts channel symbols from the modem 48 into baseband I and Q signals that are transmitted to the burst transmitter 52. In the receive direction, the RF codec 50 processes an IF signal 53 from the receiver 54 for input to the modem 48.

The burst transmitter 52 converts the I and Q signals from the RF codec 50 up to a desired frequency, preferably an L-band frequency, for transmission by the first antenna 42. The receiver 54 converts a received L-band signal from the first antenna 42 into the IF signal 53 sent to the RF codec 50.

The T/R switch 56 allows the access terminal 12 to either transmit data or receive data. The access terminal 12 also includes a synthesizer 58 that provides a fixed local oscillator (LO) signal for the RF codec 50. The synthesizer 58 includes a variable local oscillator for channel tuning within the satellite module 40 and generates data clock signals for the modem 48. Both the fixed local oscillator and the variable local oscillator within the synthesizer 58 may be adjusted based on commands from either the gateway 16 or from another access terminal 12. In the preferred embodiment, the synthesizer 58 is connected to the receiver 54 and to the cellular module 44.

The user interface module 46 includes an audio and codec unit 59, a voice processing unit 60, a controller 62, an input/output (I/O) interface 64, and a memory 66. Preferably, each element within the user interface module 46 communicates with the other user interface elements. The voice processing unit 60 includes a voice transcoder that performs source coding to compress the digital 64 Kb/s PCM signal. Specifically, an encoder running on a programmable digital signal processor, such as a low delay CELP encoder, compresses the 64 Kb/s PCM signal into approximately a 3.6 Kb/s encoded signal. Alternatively, the encoder may be a multiband excited (MBE) type 3.6 Kb/s encoder that is well known to those skilled in the art.

The controller 62 preferably provides a multitasking firmware environment for monitoring and controlling the mobile terminal hardware. The controller 62 may occupy the same processor as the voice transcoder or may optionally be disposed on a separate processor. Preferably, the controller 62 includes an I/O interface 64 that provides a communication interface with a user. The I/O interface 64 includes a keypad for data entry such as a phone number, a display, a data port for digital communication such as a facsimile transmission, and a smart card interface as specified for GSM.

The cellular module 44 allows the access terminal 12 to communicate with a cellular system over a second antenna 61. The second antenna is a linearly polarized whip meeting cellular system standards and the cellular module 44 uses standard components, such as a GSM chip set, known to those skilled in the art. Preferably, the access terminal 12 operates in a first mode where the access terminal 12 functions as a conventional cellular phone. In a second mode, the access terminal 12 preferably operates so that the access terminal 12 communicates with the satellite 14. A battery 68 is provided for portable operation of the access terminal 12.

The preferred access terminal 12 has many advantages. For example, the access terminal 12 provides dual-mode operation, either cellular or satellite. Also, the access terminal 12 is mobile and provides high quality digital voice. Further, the access terminal 12 allows for paging and messaging, transmission at a 2400 or 4800 bps data rate via the data port, and provides a convenient cellular-like interface. Also, the access terminal 12 may transmit on a single channel using a single time slot within a carrier signal allowing many other access terminals 12 to transmit over the same carrier. Thus, the access terminal 12 efficiently transmits over L-band spot beam 20 frequency resources.

Figure 3:
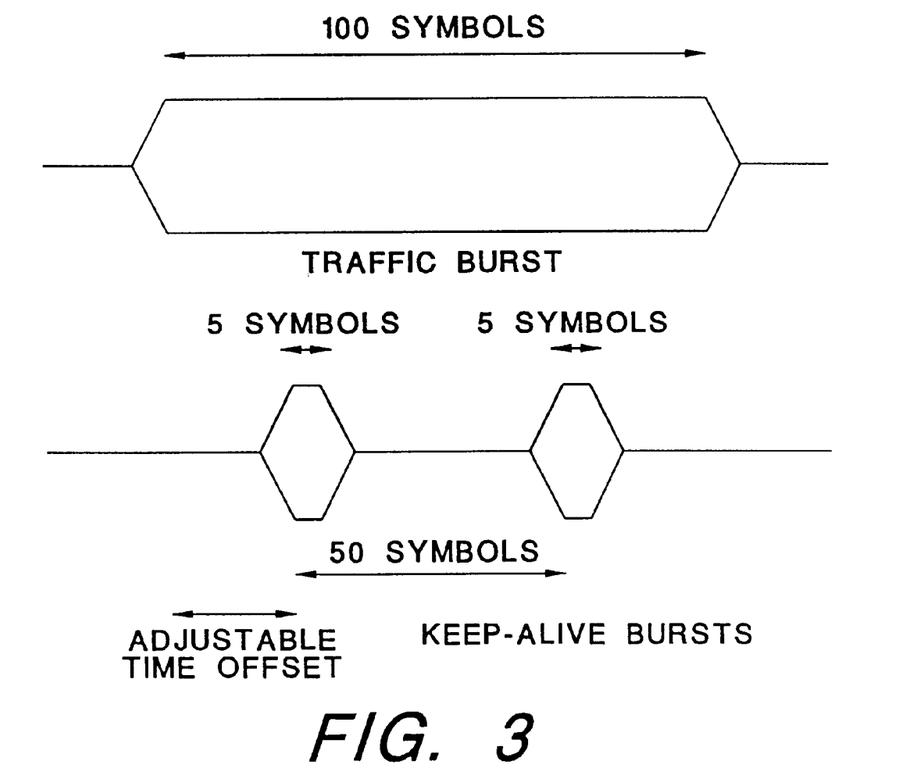
FIG. 3 shows a keep-alive burst (KAB) structure timing diagram.

The following description relates the requirements to individual design aspects of the keep-alive bursts. Note that the specific implementation defined centers around a framing design with the following features. Note that this burst arrangement is similar to that used in the Geosynchronous Earth Orbit Mobile system, but that the durations etc. have been selected to simplify the explanation while retaining the essential issues (i.e., active voice is transmitted in "traffic" bursts.) Traffic bursts are transmitted once every 40 mS and are 5 mS in duration. This 5 mS period is referred to as a slot, and the 40 mS period is a frame. Traffic bursts are transmitted using Coherent-QPSK modulation. One hundred symbols are transmitted in each traffic burst, with additional time within the 5 mS slot duration for waveform ramping, and guard time. FIG. 3 shows a KAB structure timing diagram having content and structure simultaneously satisfying the requirements for voice communications, as set forth in the following table.

| Requirement | Implementation Approach |
| --- | --- |
| Data transmission for voice background sounds | 100 bps, requiring 4 bits per frame |
| Data transmission for power control | 100 bps, requiring 4 bits perframe |
| Insensitivity to poor calibration of the linearity of power amplifiers | Transmission of KAB's occurs at the same power level as the traffic. That is, power savings arise due to a reduction in the duration of transmissions, not instantaneous power. |
| Bursts must be very short. | Synchronization or training information cannot be lengthy. The key implication of this is that coherent modulation cannot be supported (efficiently). |
| Equal or better communications performance (Bit Error Rates) than that achieved with traffic. | Differential Binary Phase Shift Keying (DBPSK) provides suitable performance. Approximately 2.5 dB is lost in performance, while 3 dB is gained in Energy-per-Bit. Hence, a slight performance improvement (~0.5 dB) arises. |
| Support for tracking of Carrier Frequency Offset by the receiver. | Short bursts provide very weak references for frequency estimation. Hence, KAB's consist of two short bursts, separated in time to ensure good frequency estimation without ambiguity. Transmission of the two short bursts must be coherently related. |
| Support for tracking of Symbol Timing by the receiver | Timing estimation is relatively easy (compared with frequency). Ongoing transmission of short bursts is sufficient. |
| Minimal delay in transmission of power control information. | Transmit data once every frame. |

The contents of the keep-alive bursts include:
1. 4 bits (symbols) of power control information;
2. 4 bits of background noise information; and
3. 2 differential reference symbols (one per burst), generating a total of 10 transmitted symbols, spread equally over the two bursts.

The separation between the bursts should be about half the length of the traffic bursts. Selection of this time depends on the following factors: Longer burst separations improve the accuracy of frequency error estimates; and shorter burst separations ensure that probability of ambiguity in the estimate of the phase difference between the two bursts is reduced. For example, with a 100 Hz error, and 2.5 mS between bursts, a phase change of 90° will occur between the bursts. Assuming that the phase relationship between the transmitted differential reference symbols is known, and that the Signal-to-Noise Ratio is reasonable, the 90° phase change is unlikely to get mistaken for the −270° phase change that would accompany a −300 Hz frequency error.

The burst separation should permit location of the bursts to enable even distribution of power in time, as viewed by the satellite. The "Adjustable Time Offset" is randomly assigned to each terminal, such that the keep-alive bursts are approximately evenly spread in time when the cumulative power reaches the satellite.

If the keep-alive bursts are fixed in time, then all carriers transmitting keep-alive bursts during a particular time slot will always be transmitting during the same instant and during that instant the power required of the satellite transponder will be higher than desired because every single carrier (both those transmitting voice bursts and those transmitting KABs) will be on simultaneously. There may be no benefit from the voice deactivation during that instant. Therefore, the KABs are distributed over time so that not every carrier transmitting KABs will transmit simultaneously. The randomly-assigned "Adjustable Time Offset" remains fixed during a call. Over all terminals, the offset is uniformly distributed between about 0 and 45 symbol periods. For this example, five periods would be an appropriate quantization of this setting.

In some specific applications (differing number of bits in the keep-alive burst or different number of bits in the traffic burst), the numbers of bits do not divide evenly. For example, if the number of traffic bits were 99 instead of 100 in the previous example, there would be seven unique potential locations for the KABs (with Adjustable Time Offsets of 0, 5, 10, 15, 20, 25, 30, 35, and 40 bits; the offset of 45 bits would not allow the second KAB to fit within the traffic burst allocation). In this case, there will be 4 bits in the middle and at the end of the traffic burst allocation which will not have anything transmitted. Therefore, it is desired that the method used for distributing the KABs accommodate these possibilities. Some useful ways are:

1. Use Adjustable Time Offset values of 0, 1, 2, . . . , 44. This solution evenly distributes the KAB energy throughout the assigned time slots throughout the system, except that the first and last 4 bit frames have increasing/decreasing amounts of power (since there are five ways to assign the KAB offsets in the middle but only one way to assign them at the beginning and end).

Figure 4:
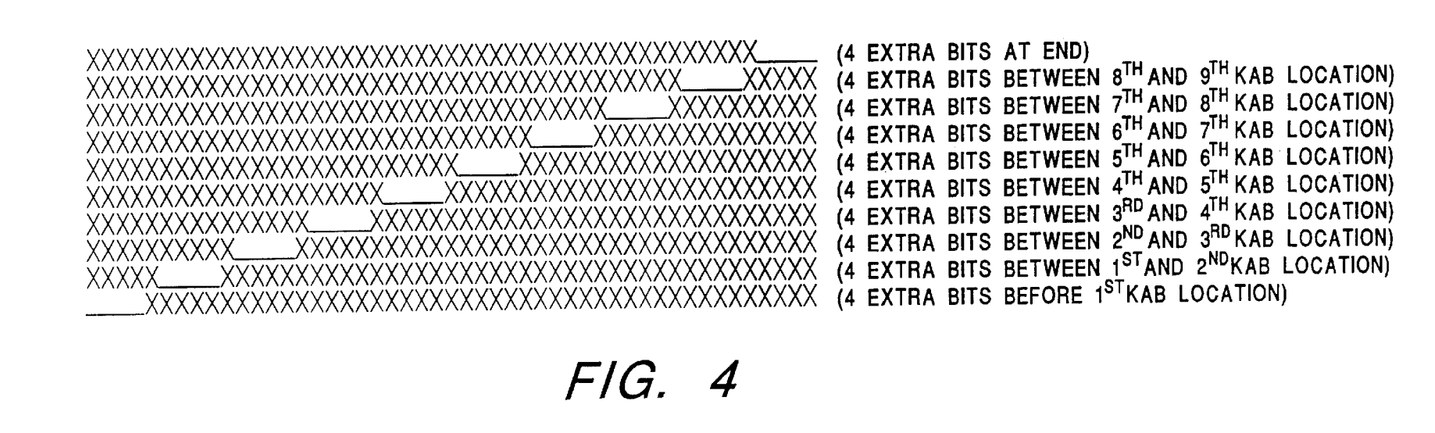
FIG. 4 illustrates KAB transmission allocation positions in active communications traffic.

2. Distribute the extra bits between the bursts as in these possible Adjustable Time Offsets as illustrated in FIG. 4, wherein the X's indicate possible locations of KAB burst energy, i.e., each X represents one bit. This distribution is even more uniformly spread than for option 1 above. Locations 0–3 are occupied %10th of the time; location 4 100% of the time, locations 5 through 8 %10ths of the time, etc.

3. Many other arrangements may be made that provide even more uniform distributions, such as distributing the 4 extra bits in all combinations of 1, 2, 3, and 4 extra bits in a row, scattered among the bursts.

4. The preceding approaches can use known, but varying, time offsets. For example, a pseudo-random sequence could be applied. The position of the transmission of the first KAB is derived from a 16 bit pseudo-random number. The eight least significant digits of the frame number (FN) of the original RACH transmitted by the AT 12 comprise the eight most significant bits of this pseudo-random number and eight least significant digits of either the telephone number called for mobile originated calls or the TMSI (IMSI) for all other cases (call termination, registration, detach, etc . . . ) include the eight least significant bits of this pseudo-random number. The resulting 16 bit number modulo 35 and modulo 54 points to the start of the transmission of the first KAB respectively for TCH2 and TCH3. For TCH4, TCH6 and TCH9 the pointer is derived using the 16 bit number respectively modulo 70, 108, and 162.

Figure 5:
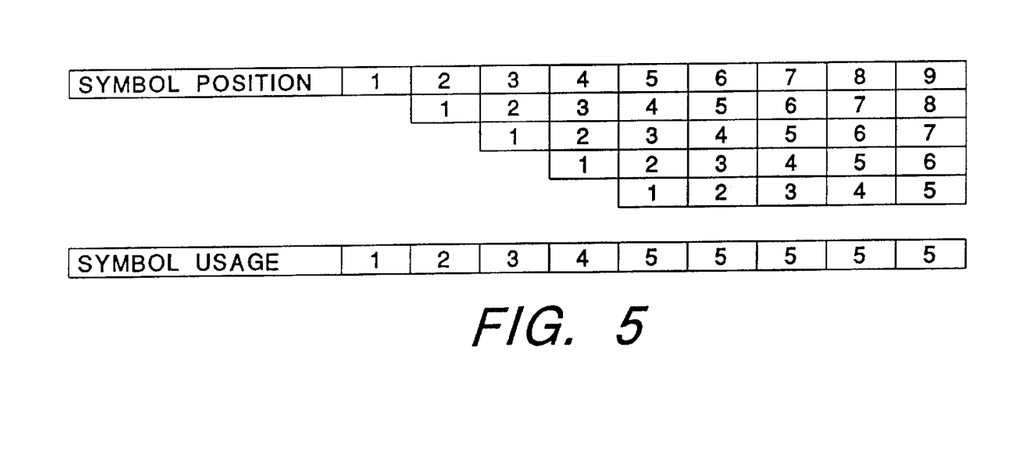
FIG. 5 shows symbol position usage at the beginning of the KAB bursts.

The first KAB pointer is returned by the gateway in the Immediate Assignment Message. The pointer to the second KAB is implemented by the gateway and the AT 12 according to the traffic channel size. The pointer to the first KAB and the separation are selected to optimize toward a uniform power distribution per symbol position over time. Excluding duplication, each symbol slot except for the first and the last 4 next to the guard times, may be selected 5 times. FIG. 5 depicts the usage for the beginning of the burst. This is the same at the end.

Figure 6:
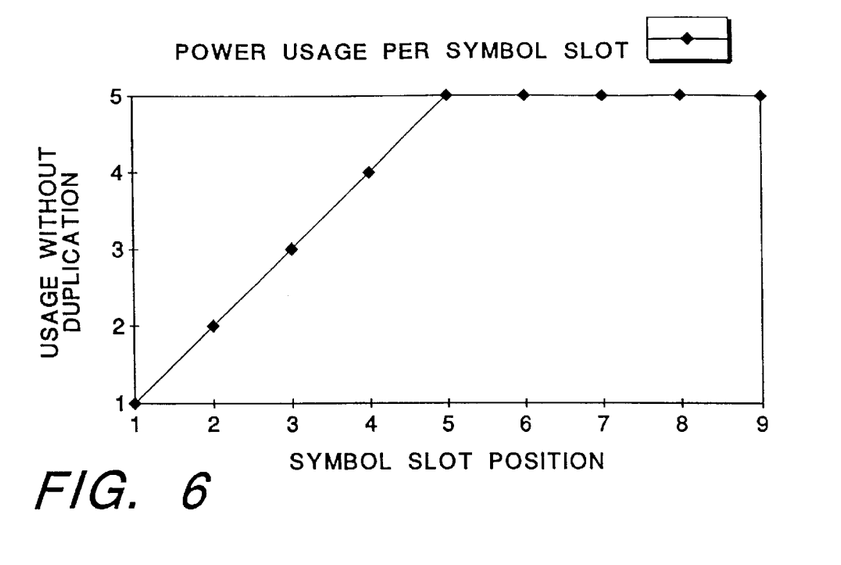
FIG. 6 shows the power distribution for the keep-alive bursts at the beginning of each burst.
Figure 7:
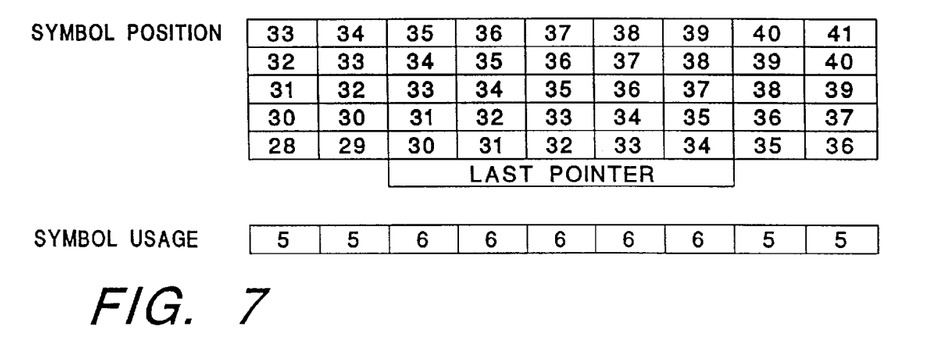
FIG. 7 is a table illustrating symbol utilization in the middle of channel TCH2.
Figure 8:
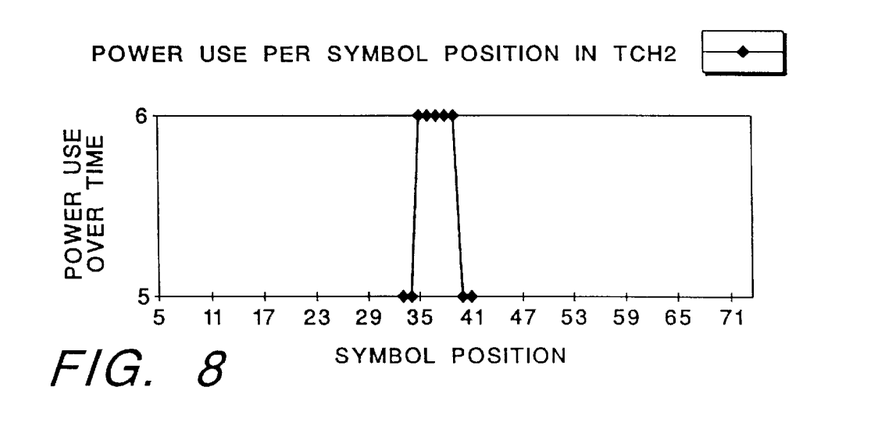
FIG. 8 is a power distribution graph showing the power use per symbol position in channel TCH2.

The keep-alive burst symbol position usage described herein provides a power distribution over time as illustrated in FIG. 6. The power distribution is typically flat over the traffic time slots except for the symbol slot at the center. In the middle, the separation from the first pointer to the last pointer is illustrated in FIG. 7, which shows symbol utilization in the middle of channel TCH2. Thus, an elevated power usage over time is shown for the symbol position employed in the power distribution as illustrated in FIG. 8. The same type of situation does not occur for channel TCH3. The derivatives have multiple power distribution symbol bumps in the half boundaries of the basic traffic channels (TCH2 and TCH3).

Figure 9:
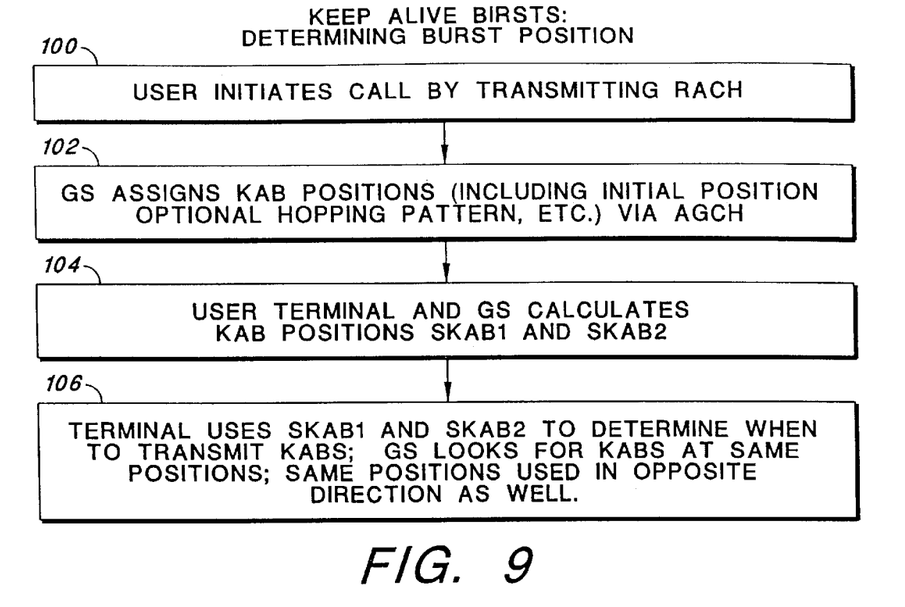
FIG. 9 is a flowchart illustrating the determination of keep-alive burst positions.

FIG. 9 is a flow chart illustrating the determination of keep-alive burst positions during the course of voice communications over a traffic channel, and particularly the positioning of keep-alive bursts during periods of voice inactivity. Initially, the user initiates the call via access terminal 12 by transmitting a random access channel request (RACH) at step 100. In the terminal to terminal call, the immediate assignment procedure provides that the access terminal 12 which originates the call, sends a channel request on the RACH with the called party number and GPS position. The access terminal 12 then waits for immediate assignment on the access grant channel (AGCH) of the corresponding, control channel (CCCH). Thus, at the same time, the gateway station 16 assigns the keep-alive burst position to the access terminal 12 via the AGCH at step 102. The access terminal 12 and the gateway station 16 calculate the keep-alive burst positions, herein at least two keep-alive burst positions (SKAB1 and SKAB2) at step 104. Thereafter, at step 106 the access terminal 12 uses the calculated keep-alive burst positions, SKAB1 and SKAB2, to determine when to transmit keep alive bursts. At the same time, the gateway station 16 looks for the keep-alive bursts (KABs) at the calculated position. The same calculated positions are used in the opposite direction as well.

Figure 10:
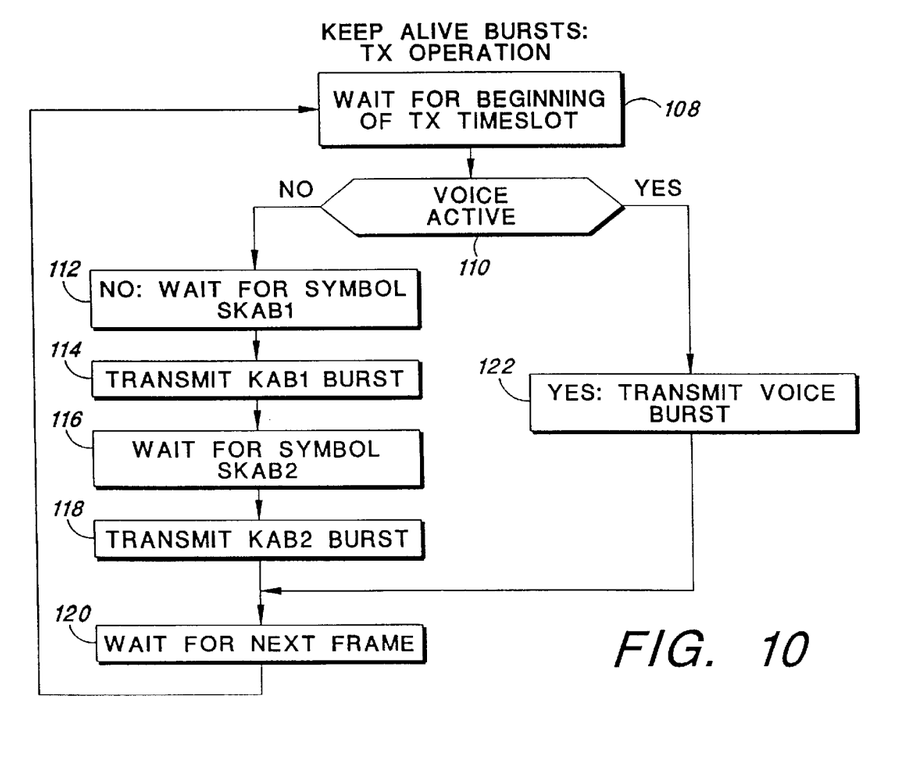
FIG. 10 is a flowchart illustrating the operation of keep-alive burst transmissions.

With reference to FIG. 10, the transmit operation used by the access terminal 12 is illustrated as a program flow chart, wherein step 108 is used to wait for the beginning of a transmit time slot in the described time division multiplex access telephony system. Step 110 then determines whether voice communications is active or inactive. During periods of voice inactivity, step 112 is indicated from step 110, step 112 causing the access terminal 12 to wait for SKAB1. Step 114 then transmits a keep-alive burst, and step 116 waits for the symbol indicating SKAB2. Step 118 is then used to transmit the second keep-alive burst, and program flow returns from step 120 to wait for the next frame, and returns the transmit operation to step 108.

Alternatively, if voice communications is active in the time slot, step 110 identifies voice activity and step 122 is used to transmit the voice burst, after which the access terminal 12 waits for the next frame at step 120 and waits for the beginning of the transmit's time slot at step 108. The above-described transmit operation is illustrated for two keep-alive burst positions during periods of voice inactivity, as shown in FIG. 3.

Figure 11:
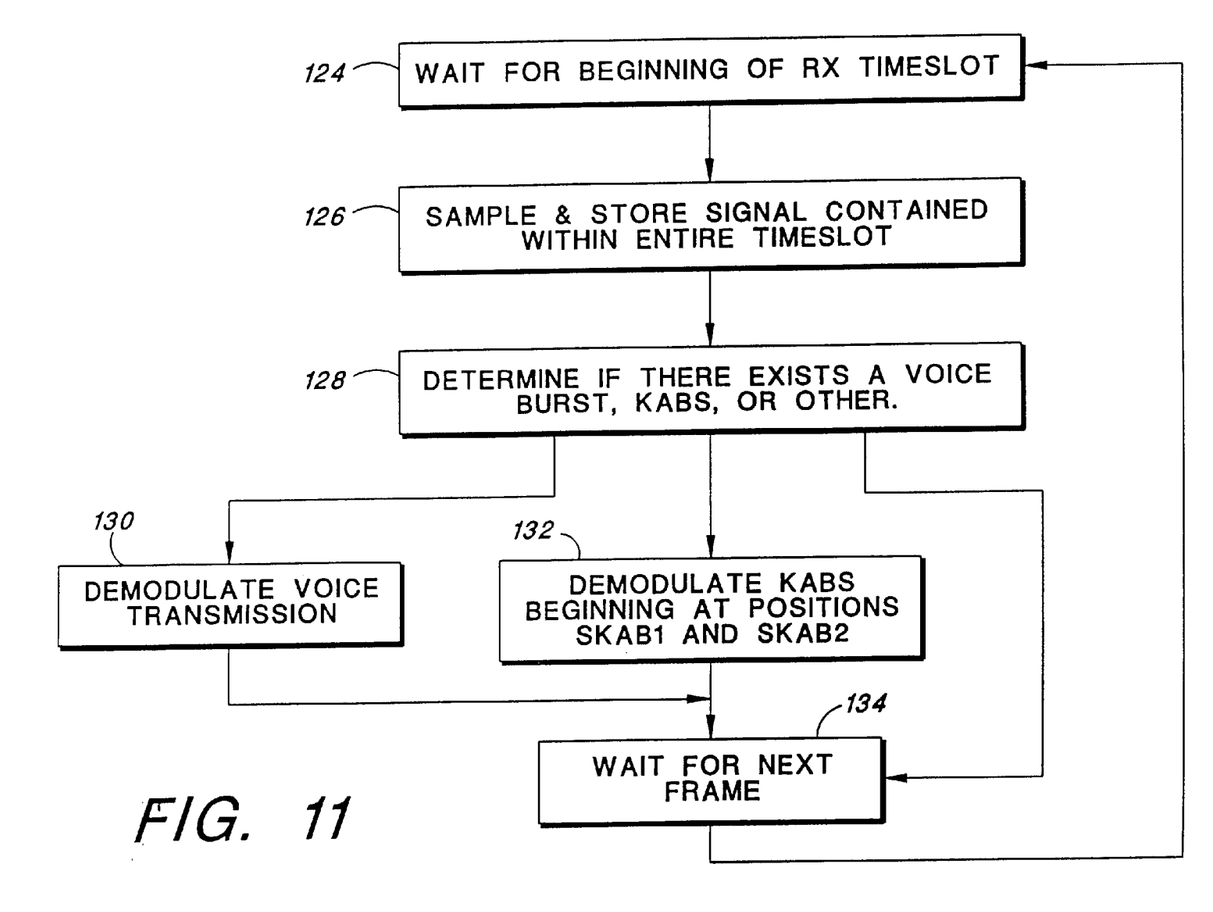
FIG. 11 is a flowchart illustrating the receive operation associated with the keep-alive burst transmissions of FIG. 10.

The gateway station 16 performs a keep-alive burst receive operation as illustrated in the program flow chart of FIG. 11, wherein the gateway station 16 waits for the beginning of a receive time slot at step 124. At step 126, the gateway station 16 samples and stores the signal contained in the entire time slot received. The operation performed at step 128 determines if there exists a voice burst, a keep-alive burst, or other in the received time slots. Where a voice burst was received at step 128, step 130 then demodulates the voice transmission, and the gateway station 16 waits for the next frame at step 134, from which program flow returns to wait for the beginning of the receive time slot at step 124. Where a keep-alive burst was received at step 128, step 132 demodulates the keep-alive burst beginning at positions SKAB1 and SKAB2, and upon completion of the keep-alive burst demodulation, program flow returns via step 134. If nothing has been received in the receive time slots, a step 128 does not demodulate transmissions, but rather returns to wait for the next frame at step 134, returning program flow as described above to wait for the beginning of the received time slot at step 124.

It should be appreciated that a wide range of changes and modifications may be made to the preferred embodiments as described herein. Thus, it is intended that the foregoing detailed description be regarded as illustrative rather than limiting and that the following claims, including all equivalents, are intended to define the scope of the invention.

What is claimed is:

1. An access terminal for maintaining discontinuous information communications, comprising:
a transmitter for establishing a radio frequency communication link allowing an access terminal to initiate information communication via at least one of a multiplicity of communication channels; and a memory for storing protocol processing information comprising a signal pattern assigned to the access terminal via the communication system for transmission by said transmitter during periods of inactivity to maintain information communication over the radio frequency communication link, said signal pattern including information for allowing a receiver to acquire and track frequency drift between said transmitter and said receiver.

2. An access terminal as recited in claim 1 wherein said transmitter detects periods of voice inactivity and periodically transmits the signal pattern to maintain information communication over the radio frequency communication link.

3. An access terminal as recited in claim 2 wherein said transmitter transmits a plurality of keep-alive bursts.

4. An access terminal as recited in claim 3 wherein said memory stores the keep-alive bursts as a plurality of symbols for transmission during a multiple symbol traffic burst.

5. The access terminal of claim 1, wherein said protocol processing information includes information representing at least one of a description of background sounds present at a microphone of said access terminal, commands and status messages associated with power control, a power level of a signal, signal quality as perceived by the receiver, and information used in tracking both carrier frequency offset and symbol timing error for synchronization between the access terminal and receiver.

6. The access terminal of claim 5, wherein said information included in said protocol processing information comprises said description of background sounds present at said microphone, and said commands and status messages associated with power control.

7. The access terminal of claim 5, wherein said information included in said protocol processing information represents said power level of a signal, said signal quality as perceived by a receiver, and said information used in tracking both carrier frequency offset and symbol timing error for synchronization between the transmitter and receiver.

8. A system for maintaining discontinuous information communications, comprising:
   a receiver for receiving the discontinuous information communications;
   a radio frequency communication link for conveying multiple communication channels;
   an access terminal for estimating the location of a terminal of a satellite-based communications system, comprising:
   a memory for storing protocol processing information; and
   a transmitter for establishing the radio frequency communication link to said receiver;
   said memory storing a signal pattern assigned to said access terminal by said receiver for transmission by said transmitter during periods of inactivity to maintain information communication with said receiver, said signal pattern including information for allowing said receiver to acquire and track frequency drift between said transmitter and said receiver.

9. A system as recited in claim 8 wherein said receiver comprises a gateway station in a communication system, said gateway station receiving voice traffic bursts from said access terminal on a periodic basis for maintaining information communication over the radio frequency communication link.

10. A system as recited in claim 8 wherein said memory stores a plurality of keep-alive burst symbols for transmission by said transmitter of said access terminal during periods of voice inactivity.

11. The system of claim 8, wherein said protocol processing information includes information representing at least one of a description of background sounds present at a microphone of said access terminal, commands and status messages associated with power control, a power level of a signal, signal quality as perceived by the receiver, and information used in tracking both carrier frequency offset and symbol timing error for synchronization between the access terminal and receiver.

12. The system of claim 11, wherein said information included in said protocol processing information comprises said description of background sounds present at said microphone, and said commands and status messages associated with power control.

13. The system of claim 11, wherein said information included in said protocol processing information represents said power level of a signal, said signal quality as perceived by a receiver, and said information used in tracking both carrier frequency offset and symbol timing error for synchronization between the transmitter and receiver.

14. A method of maintaining discontinuous information communication from an access terminal to a receiver over a radio frequency communication link for conveying multiple communication channels, comprising the steps of:
   initiating information communication from the access terminal via at least one of the multiple communication channels;
   assigning protocol processing information in the form of a signal pattern for transmission by the access terminal, said signal pattern including information for allowing said receiver to acquire and track frequency drift between said terminal and said receiver; and
   transmitting the assigned signal pattern via the access terminal during periods of inactivity to maintain information communication with the receiver.

15. A method as recited in claim 14 wherein said assigning step assigns keep-alive burst positions for transmission of keep-alive burst symbols as the assigned signal pattern to maintain information communication with the receiver.

16. A method as recited in claim 15 comprising the step of detecting periods of voice inactivity at the access terminal.

17. A method as recited in claim 16 wherein said keep-alive bursts comprise a plurality of positions in a traffic burst from the access terminal.

18. A method as recited in claim 17 wherein said access terminal calculates keep-alive burst positions.

19. A method as recited in claim 18 wherein said keep-alive burst positions comprise a hopping pattern.

20. A method as recited in claim 19 comprising the step of determining when to transmit keep-alive burst symbols with the access terminal.

21. A method as recited in claim 14 comprising the step of determining if information communication received from the access terminal includes a voice burst, keep-alive bursts, or inactivity via at least one of the multiple communication channels.

22. The method of claim 14, wherein said protocol processing information includes information representing at least one of a description of background sounds present at a microphone of said access terminal, commands and status messages associated with power control, a power level of a signal, signal quality as perceived by the receiver, and information used in tracking both carrier frequency offset and symbol timing error for synchronization between the access terminal and receiver.

23. The access terminal of claim 22, wherein said information included in said protocol processing information comprises said description of background sounds present at said microphone, and said commands and status messages associated with power control.

24. The access terminal of claim 22, wherein said information included in said protocol processing information represents said power level of a signal, said signal quality as perceived by a receiver, and said information used in tracking both carrier frequency offset and symbol timing error for synchronization between the transmitter and receiver.

25. A method of maintaining discontinuous information communication from an access terminal to a receiver over a radio frequency communication link for conveying multiple communication channels, comprising the steps of:
   initiating information communication from the access terminal via at least one of the multiple communication channels;
   assigning, in the form of a signal pattern for transmission by the access terminal, keep alive burst positions for transmission of keep-alive burst symbols including protocol processing information, said keep alive burst positions comprising a hopping pattern, said signal pattern including information for allowing said receiver to acquire and track frequency drift between said terminal and said receiver; and controlling the access terminal to transmit the assigned signal pattern with during periods of inactivity to maintain information communication with the receiver.

26. The method of claim 25, further comprising the step of determining when to control said access terminal to transmit said keep-alive burst symbols with the access terminal.

27. An access terminal for maintaining discontinuous information communications, comprising:

a transmitter for establishing a radio frequency communication link allowing an access terminal to initiate information communication via at least one of a multiplicity of communication channels; and a memory for storing protocol processing information comprising a signal pattern assigned to the access terminal via the communication system for transmission by said transmitter during periods of inactivity to maintain information communication over the radio frequency communication link, wherein said protocol processing information includes information representing at least one of a description of background sounds present at a microphone of said access terminal, commands and status messages associated with power control, a power level of a signal, signal quality as perceived by the receiver, and information used in tracking both carrier frequency offset and symbol timing error for synchronization between the access terminal and receiver.

28. The access terminal of claim 27, wherein said information included in said protocol processing information comprises said description of background sounds present at said microphone, and said commands and status messages associated with power control.

29. The access terminal of claim 27, wherein said information included in said protocol processing information represents said power level of a signal, said signal quality as perceived by a receiver, and said information used in tracking both carrier frequency offset and symbol timing error for synchronization between the transmitter and receiver.

30. A system for maintaining discontinuous information communications, comprising:

a receiver for receiving the discontinuous information communications;

a radio frequency communication link for conveying multiple communication channels;

an access terminal for estimating the location of a terminal of a satellite-based communications system, comprising:

a memory for storing protocol processing information; and a transmitter for establishing the radio frequency communication link to said receiver;

said memory storing a signal pattern assigned to said access terminal by said receiver for transmission by said transmitter during periods of inactivity to maintain information communication with said receiver, wherein said protocol processing information includes information representing at least one of a description of background sounds present at a microphone of said access terminal, commands and status messages associated with power control, a power level of a signal, signal quality as perceived by the receiver, and information used in tracking both carrier frequency offset and symbol timing error for synchronization between the access terminal and receiver.

31. The system of claim 30, wherein said information included in said protocol processing information comprises said description of background sounds present at said microphone, and said commands and status messages associated with power control.

32. The system of claim 30, wherein said information included in said protocol processing information represents said power level of a signal, said signal quality as perceived by a receiver, and said information used in tracking both carrier frequency offset and symbol timing error for synchronization between the transmitter and receiver.

33. A method of maintaining discontinuous information communication from an access terminal to a receiver over a radio frequency communication link for conveying multiple communication channels, comprising the steps of:

initiating information communication from the access terminal via at least one of the multiple communication channels;

assigning protocol processing information in the form of a signal pattern for transmission by the access terminal; and transmitting the assigned signal pattern via the access terminal during periods of inactivity to maintain information communication with the receiver, wherein said protocol processing information includes information representing at least one of a description of background sounds present at a microphone of said access terminal, commands and status messages associated with power control, a power level of a signal, signal quality as perceived by the receiver, and information used in tracking both carrier frequency offset and symbol timing error for synchronization between the access terminal and receiver.

34. The access terminal of claim 33, wherein said information included in said protocol processing information comprises said description of background sounds present at said microphone, and said commands and status messages associated with power control.

35. The access terminal of claim 33, wherein said information included in said protocol processing information represents said power level of a signal, said signal quality as perceived by a receiver, and said information used in tracking both carrier frequency offset and symbol timing error for synchronization between the transmitter and receiver.

* * * * *

UNITED STATES PATENT AND TRADEMARK OFFICE
CERTIFICATE OF CORRECTION

PATENT NO. : 6,385,447 B1
DATED : May 7, 2002
INVENTOR(S) : Muhammad Soleimani

It is certified that error appears in the above-identified patent and that said Letters Patent is hereby corrected as shown below:

<u>Title page,</u>
Item [57], ABSTRACT, should read as follows: -- A system and method employing an access terminal for maintaining discontinuous communications including a gateway receiver for receiving the discontinuous information, a radio frequency (RF) communication link via geosynchronous earth orbit satellite conveying multiple communication channels using time division multiple access (TDMA), the access terminal initiating information communication with the receiver via at least one of the multiple communication channels. The access terminal further includes a memory for storing protocol processing information and a transmitter for establishing the radio frequency communication link to the receiver of the terrestrial gateway system. The access terminal memory provides for storing of a signal pattern or protocol assigned to the access terminal by the gateway receiver or transmission of keep-alive bursts by the transmitter during periods of inactivity to maintain information communication with the receiver. --

Signed and Sealed this

Twelfth Day of November, 2002

*Attest:*

*Attesting Officer*

JAMES E. ROGAN
*Director of the United States Patent and Trademark Office*